(12) United States Patent
Haegel et al.

(10) Patent No.: US 6,695,976 B2
(45) Date of Patent: Feb. 24, 2004

(54) WATER-CONTINUOUS SYSTEMS AND POLYMERIZATION METHOD

(76) Inventors: Franz-Hubert Haegel, Rurstr. 28, 53249 Düren (DE); Julia Schlüpen, Hügelstr. 57, 40589 Düsseldorf (DE); Joachim Walter Schultze, 40221 Räuscherweg 37, 40221 Düsseldorf (DE); Stephan Winkels, Wüllenweberstr. 36A, 41066 Mönchengladbach (DE)

( * ) Notice: Subject to any disclaimer, the term of this patent is extended or adjusted under 35 U.S.C. 154(b) by 130 days.

(21) Appl. No.: 09/976,638

(22) Filed: Oct. 12, 2001

(65) Prior Publication Data

US 2002/0043470 A1 Apr. 18, 2002

Related U.S. Application Data

(63) Continuation-in-part of application No. PCT/DE00/01242, filed on Apr. 18, 2000.

(30) Foreign Application Priority Data

Apr. 19, 1998 (DE) .......................................... 199 17 569

(51) Int. Cl.[7] .......................... C09K 19/52; C09K 3/00; C25D 5/02

(52) U.S. Cl. ................. 252/299.01; 516/53; 252/299.5; 205/159

(58) Field of Search ........................ 252/299.01, 299.1, 252/299.5; 56/53; 205/159

(56) References Cited

U.S. PATENT DOCUMENTS 5,575,898 A * 11/1996 Wolf et al. ................. 205/125

OTHER PUBLICATIONS

Haegel et al., "ANodic polymerization of thiophene derivatives from microemulsions and liquid crystals", Electrochimica Acta 46 (2001), pp. 3973–3984.*

* cited by examiner

Primary Examiner—Shean C. Wu
(74) Attorney, Agent, or Firm—Klaus J. Bach (57) ABSTRACT

In a water-continuous system and a polymerization method, the water-continuous system comprises a polymerizable aromatic compound as an oil, water and a non-ionic surfactant, wherein the polymerizable aromatic compound is a component from the group consisting of: thiophene, furan and alkyl, alkoxy or alkylenedioxy derivatives of thiophene and furan. The non-ionic surfactant is an alkyl polyethoxylate and/or an alkyl polyglucoside.

9 Claims, 6 Drawing Sheets

WATER-CONTINUOUS SYSTEMS AND POLYMERIZATION METHOD

This is a CIP application of international application PCT/DE00/01242 filed Apr. 18, 2000 and claiming the priority of German application 199 17 569 A1 filed Apr. 19, 1999.

BACKGROUND OF THE INVENTION

The invention relates to a water-continuous system and a method of polymerization.

In the prior art water-continuous systems of polymerizable aromatic oils are known which are used for coating surfaces. Thus DE OS 42 29 192 A1 shows a shaped glass part with an antistatic coating which was chemically produced with thiophene derivatives, like 3,4-ethylenedioxythiophene (EDT) from a dilute aqueous solution of the monomers by using polystyrene sulfonic acid as solvating agent. More concentrated water-continuous systems are presented in U.S. Pat. No. 5,575,898. Wolf et al. discloses a process for through-hole plating with microemulsions containing 3,4-substituted thiophenes up to 9%. The microemulsions are formed by diluting with water up to 10% of a concentrate comprising a surfactant and up to 90% of the thiophene derivatives. The maximum concentration of the thiophene derivatives in a microemulsion used for the polymerization by an oxidizing agent is disclosed in EXAMPLE 3 of U.S. Pat. No. 5,575,898. A microemulsion with 1.2% of 3,4-ethylenedioxythiophene was used for the deposition of the polymer on a printed circuit board which had been treated with potassium permanganate. The documents FR 2,698,379, FR 2,698,380 and EP 695,794 demonstrate the electrochemical polymerization of pyrrol and pyrrol derivatives.

The processes known from the prior art for the coating from water-continuous systems, however, have some disadvantages. The rate of deposition for the coating by electrochemical polymerization is very low for those processes. Very high potentials must be chosen for the deposition yielding a reduced quality of the products. Furthermore, the layer thickness of the polymer coating is difficult to regulate yielding less controlled products with respect to the thickness of coating. The consumed monomer must be replaced by dosing and poorly dissolves in diluted water-continuous systems. For that reason coating cannot be performed in a continuous process from water-continuous systems according to the prior art.

Therefore, it is the objective of the invention to provide a water-continuous system, which exhibits a high deposition rate and a low deposition potential during the electrochemical polymerization, and further enables a good control and regulation of the thickness of the coating during the chemical polymerization. Moreover, the coating shall be practicable in a continuous process.

With the water-continuous system of the invention, it is possible now to coat surfaces in a continuous process with high rates of deposition and under control of the development of the layer thickness. Using liquid crystalline systems, the generation of layers of defined thickness is possible. It is controlled by the conditions of deposition. For the electrochemical polymerization, it is possible to work with lower deposition potentials. A better quality of the layer is obtained.

The invention will become apparent in greater detail from the description of examples on the basis of the accompanying drawings.

DESCRIPTION OF VARIOUS EMBODIMENTS

According to the invention a water-continuous system is provided which occurs in form of emulsions, microemulsions and liquid crystals. Microemulsions and liquid crystals may coexist in the system. Emulsions are kinetically stable. Microemulsions and liquid crystals are thermodynamically stable systems.

The water-continuous systems of the invention are able to contain high proportions of oils, which are not completely soluble in water. They are stabilized by non-ionic surfactants. The use of non-ionic surfactants is advantageous because ionic surfactants are incorporated into the polymer and can influence the electric properties negatively owing to their charge. As non-ionic surfactants alkyl polyethoxylates and/or alkyl polyglucosides can be used. The alkyl chain preferably has a length $<C_{12}$ and preferably is branched for the production of microemulsions. Among others polyethoxylates of the $C_{10}$ oxoalcohol (e.g. Lutensol ON from BASF) and an alkyl polyglucoside ($C_{12/14}G_{1.3}$) from a pilot plant of the Huels company with a chain length of $C_{12/14}$ and a degree of glucosidation of 1.3 were used. By means of mixtures of surfactants, in particular of alkyl polyethoxylates with alkyl polyglucosides the temperature range for the microemulsion can be adjusted. In contrast, surfactants with a chain length $\geq C_{12}$ (Lutensol A7N from BASF, polyoxyethylene 10 laurylether from Sigma) and preferably linear alkyl chains are used in particular for the formation of liquid crystals. The range of $\geq C_{12}$ to $C_{20}$ is particularly preferable. Polymeric non-ionic surfactants can also be used. For the production of emulsions castor oil ethoxylates, like Uniperol EL from BASF are suitable in particular.

Oils, in the sense of the invention, are polymerizable aromatic compounds, like aniline, thiophene, pyrrol, furan, and their derivatives. These derivatives are e.g. alkyl, alkoxy or alkylenedioxy substituted derivatives of the parent compounds. 3-methylthiophene, 3-methoxythiophene, 3,4-dimethoxythiophene, and 3,4-ethylenedioxythiophene are named as examples. The polymer of 3-methoxythiophene can be switched between the reduced and the oxidized state and therefore can be used as an optical switch. All these compounds can be polymerized to conductive materials. Thereby the polymerization can be achieved by chemical means, e.g. by addition of iron (III) salts or by anodic oxidation. In the case of anodic oxidation electrolytes, like $K_2SO_4$ or $LiClO_4$ must be added to the water continuous system. Any electrolyte can virtually be used.

The conductive polymers can be used for the antistatic coating of polymer and glass surfaces, as coatings for electrodes for biosensors and light emitting diodes, as optical switches, as membranes with a mechanical separation effect and coincident conductivity, and for the production of circuit boards as support for the deposition of metals.

With the water-continuous composition of the invention, a higher concentration of oil (i.e. monomer polymerizable aromatic compounds) can be employed than with the prior state of the art. In particular, bicontinuous microemulsions contain about equal amounts of water and oil.

The water-continuous systems of the invention facilitate a clearly higher rate of deposition and lower deposition potentials and consequently an improved product quality for the electrochemical polymerization in particular. Moreover continuous processing with easier replacement of the consumed monomers is possible by dosing, because the monomers dissolve readily and fast in the concentrated systems. If the systems contain liquid crystals according to the thermodynamic conditions, the generation of liquid crystal layers of defined thickness before the polymerization and, with it, a control of the layer thickness of the polymer is possible. This provides for the defined coating of surfaces and permits the production of membranes. Above all, the presence of liquid crystals takes is particularly favorable for the chemical polymerization and in the manufacture of membranes.

In the water-continuous systems of the invention 1% to 75% of oil can be taken up. The specification % here means the weight per weight percent of masses referred to the entire water-continuous system. In a preferred range the portion of oil amounts from 5% to 50%, and in a particularly preferred range from 30% to 50%. Hitherto, the best results could be obtained with a concentration of 62%.

Below, some examples shall be presented.

EXAMPLES

1. Systems 1.1 Thiophene

| surfactant/ phase | surfactant content/ % | water content/ % 0.5 M Li-ClO$_4$ | thiophene content/ % | investigated range |
|---|---|---|---|---|
| Lutensol ON 80/ microemulsion | 40 | 30 | 30 | 25–35° C. |
| Lutensol ON 80/ microemulsion | 40 | 55 | 5 | $\geq$10° C. |
| Lutensol ON 80/ liquid crystal | 10 | 85 | 5 | $\leq$54° C. |
| Lutensol A7N/ liquid crystal | 40 | 30 | 30 | 10–25° C. |
| polyoxyethylene 10 laurylether/ liquid crystal | 40 | 30 | 30 | $\leq$50° C. |

1.2. 3-Methylthiophene

| surfactant/ phase | surfactant content/ % | water content/ % 0.5 M Li-ClO$_4$ | 3-methyl-thiophene content/ % | investigated range |
|---|---|---|---|---|
| Lutensol ON 80/ microemulsion | 40 | 30 | 30 | 40–55° C. |
| Lutensol ON 80/ liquid crystal | 40 | 30 | 30 | $\leq$35° C. |

1.3. 3,4-Ethylenedioxythiophene (EDT)

| surfactant/ phase | surfactant content/ % | water content/ % 0.5 M Li-ClO$_4$ | EDT content/ % | investigated range |
|---|---|---|---|---|
| Lutensol ON 110/ microemulsion | 40 | 30 | 30 | $\geq$25° C. |
| Lutensol ON 110 $C_{12/13}G_{1.3}$*/ microemulsion | 37.0 | 31.8 | 31.2 | 35–40° C. |
| Lutensol ON 110 $C_{12/13}G_{1.3}$* emulsion | 37.0 | 31.8 | 31.2 | $\leq$25° C. |
| Lutensol ON 110 microemulsion | 20 | 75 | 5 | 10–50° C. |
| Uniperol EL emulsion | 10 | 45 | 45 | 10–30° C. |

*The mass fractions of Lutensol ON 110 and $C_{12/14}G_{1.3}$ are 28.8 and 8.2%

1.4. Furane

| surfactant/<br>phase | surfactant content/<br>% | water content/<br>% 0.5 M Li-ClO$_4$ | furane content/<br>% | investigated range |
|---|---|---|---|---|
| Lutensol ON 80/<br>microemulsion | 40 | 30 | 30 | 25–40° C. |

1.5. 3-Methoxythiophene

| surfactant/<br>phase | surfactant content/<br>% | water content/<br>% 0.5 M Li-ClO$_4$ | 3-methoxy-thiophene content/<br>% | investigated range |
|---|---|---|---|---|
| Lutensol ON 80/<br>liquid crystal | 35 | 47 | 18 | 25–40° C. |
| Lutensol ON 80/<br>microemulsion | 35 | 47 | 18 | >40° C. |

1.6. Pyrrol

| surfactant/<br>phase | surfactant content/<br>% | water content/<br>% 0.5 M Li-ClO$_4$ | Pyrrol content/<br>% | investigated range |
|---|---|---|---|---|
| Lutensol ON 110<br>C$_{12/14}$G$_{1.3}$*<br>emulsion | 65 | 23.5 | 11.5 | 25° C. |

*The mass fractions of Lutensol ON 110 and C$_{12/14}$G$_{1.3}$ are 35 and 30% based on the entire system.

1.7 Isothermal phase diagrams
1.7.1 Phase Diagrams with 3,4-Ethylenedioxythiophene (EDT)

Figure 1:
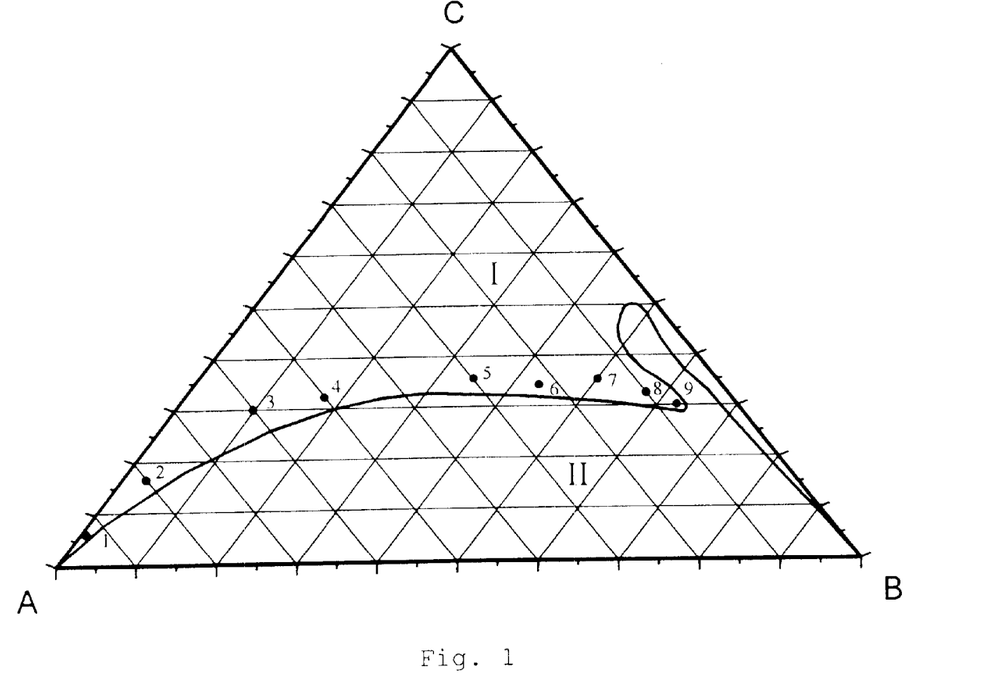
FIG. 1: shows the isothermal phase diagram of the system
B=3,4-ethylenedioxythiophene
A=0.5 M aqueous $LiClO_4$ solution
C=Lutensol ON 110 at 25° C.
(I)=microemulsion
(II)=multiple phase regions
numbers 1–9=numbering of samples
(experiment 1.7.1)
Figure 2:
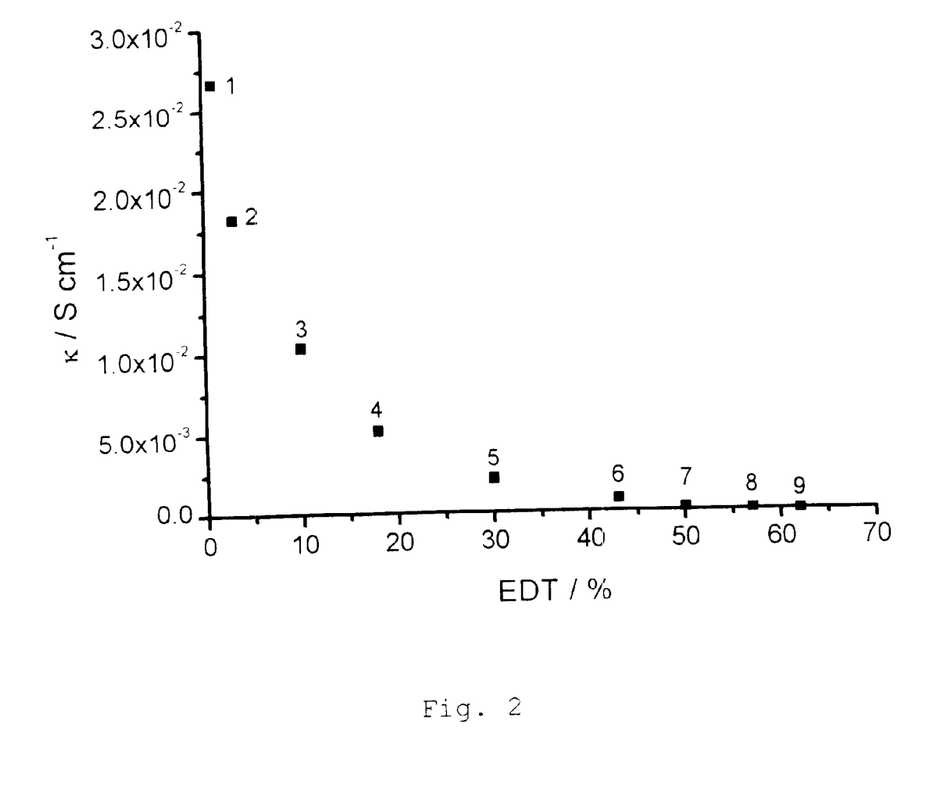
FIG. 2: shows the specific conductivity of selected samples of the system
3,4-ethylenedioxythiophene (EDT)/0.5 M aqueous $LiClO_4$ solution/Lutensol ON 110;
abscissa X=mass fraction of EDT % w/w
ordinate Y=conductivity $[\kappa/\Omega^{-1}\ cm^{-1}]$
numbers 1–9=numbering of samples
(experiment 1.7.1)

It is evident from the isothermal phase diagram of 3,4-ethylenedioxythiophene with the surfactant Lutensol ON 110 and a 0.5 M aqueous LiClO$_4$ solution that, at 25° C., no liquid crystals are formed. In FIG. 1, only an extended single phase region (I) and a region of multiple phases (II) can be observed. The conductivities of the samples 1–9 are presented in FIG. 2. They show a steady decrease with increasing oil content. However, the conductivity of sample 9 with a content of 62% of EDT is still 44·10$^{-6}$ Ω$^{-1}$ cm$^{-1}$ definitely corresponding to a water-continuous system.

1.7.2. Phase Diagram of 3-methoxythiophene

Figure 3:
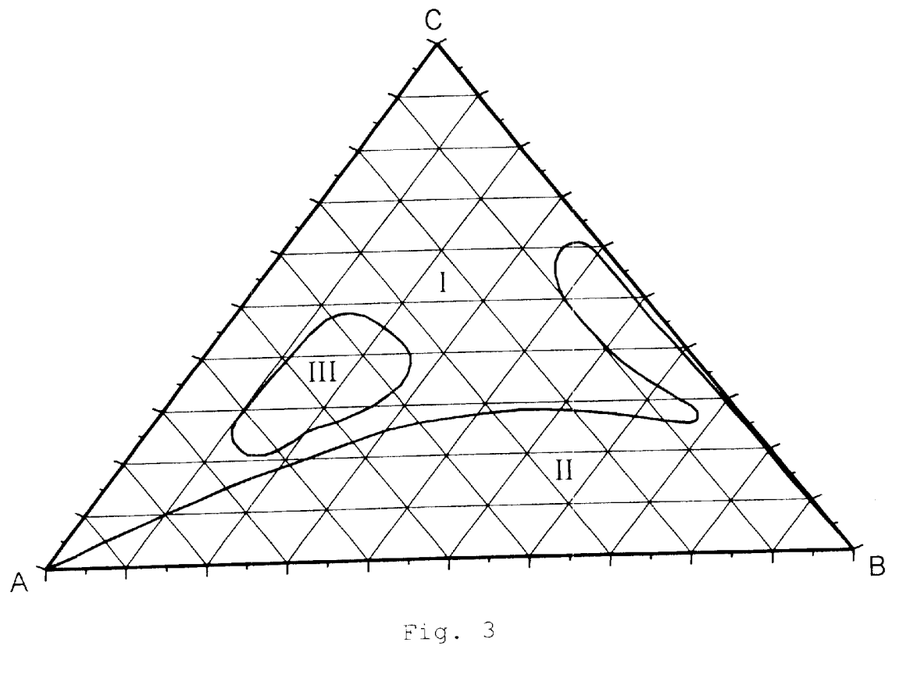
FIG. 3: shows the isothermal phase diagram of the system
B=3-methoxythiophene
A=0.5 M aqueous $LiClO_4$
C=Lutensol ON 80 at 25° C.
(I)=single phase region
(II)=multiple phase regions
(III)=liquid crystals
numbers 1–9=numbering of samples
(Experiment 1.7.2)
Figure 4:
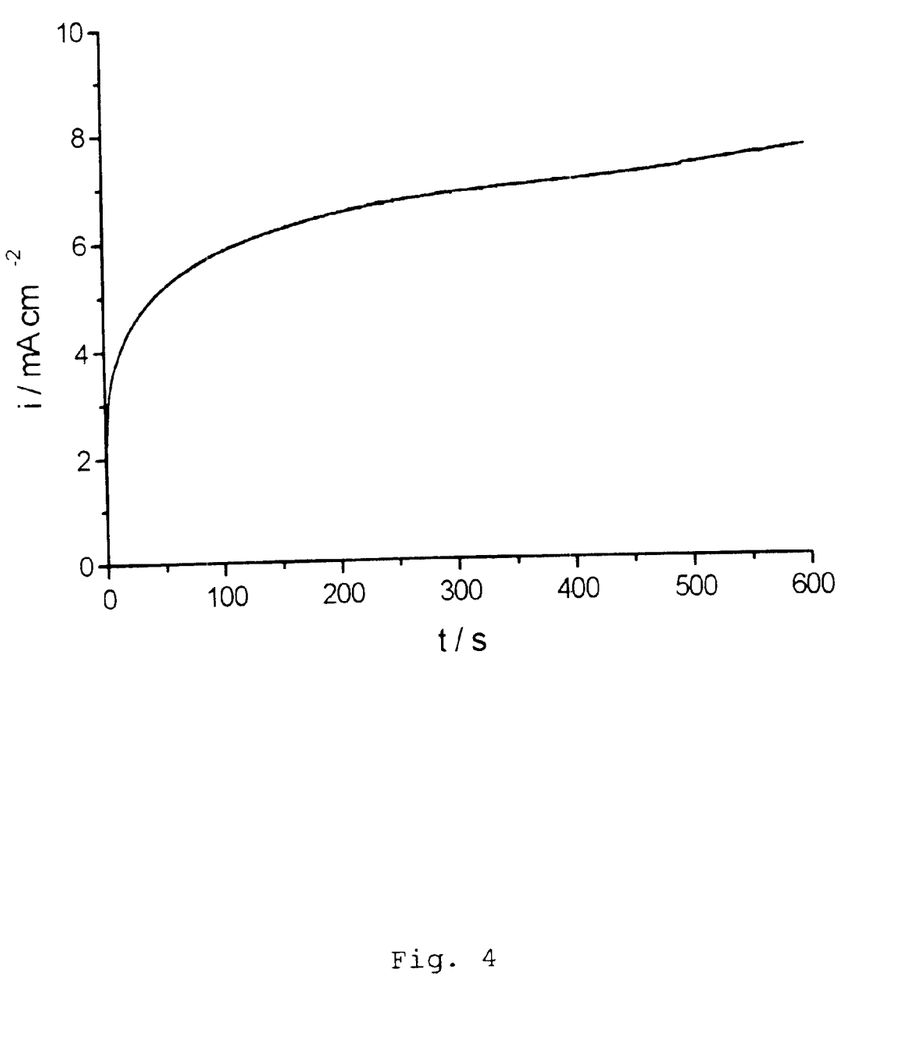
FIG. 4: shows the current transient for the polymerization of the system EDT: 30%; electrolyte solution (0.5 M $LiClO_4$): 30%; surfactant: 40%; UB: 1.2 V (SHE);
abscissa X=t [s];
ordinate Y=i $[mA\ cm^{-2}]$
(Experiment 2.2.1)

From the isothermal phase diagram (FIG. 3) of 3-methoxythiophene with the surfactant Lutensol ON 80 and a 0.5 M aqueous LiClO$_4$ solution, it is evident that liquid crystals also occur besides a single phase region (I) and a region of multiple phases (II) at 25° C.

2. Polymerization
2.1. Chemical Polymerization 0.3 g of a 0.5 M aqueous FeCl$_3$ solution was added to a mixture of 4 g Lutensol ON 110, 3 g 3,4-ethylenedioxythiophene and 2.7 g of a 0.5 M aqueous LiClO$_4$ solution. The polymerization could clearly be recognized optically after about half an hour by a blue coloring of the solution.

2.2. Electropolymerization
2.2.1. Electropolymerization with Lutensol ON 110, LiClO$_4$ Solution and 3,4-ethylenedioxythiophene A mixture of 40% Lutensol ON 110, 30% of a 0.5 M aqueous LiClO$_4$ solution and 30% of 3,4-ethylenedioxythiophene was used as the system. The electrochemical formation of poly(ethylenedioxythiophen) was performed at 30° C. in a temperature-controlled electrochemical cell with a three-electrode configuration (working electrode: platinum single crystal or platinum sheet with areas of 7.4·10$^{-3}$ cm$^2$ and 1 cm$^2$ respectively; counter electrode: platinum sheet with an area of 4 cm$^2$; reference electrode: mercury sulfate electrode with K$_2$SO$_4$ as electrolyte) and a home made potentiostat system (Schramm, HHU Duesseldorf) After a pre-polarization at 0.4 V for 20 s the anodic deposition potential of 1.2 V (SHE) was applied for 600 s. The polymer was deposited as a strongly adherent dense and complete layer which was stable against diluted acids.

2.2.2. Electropolymerization with three additional systems

Mixtures with the following compositions 3,4-ethylenedioxythiophene (EDT)/0.5 M aqueous LiClO$_4$ solution/Lutensol ON 110 were used as the systems:

| system | EDT content/<br>% | content of 0.5 M LiClO$_4$/<br>% | surfactant content/<br>% |
|---|---|---|---|
| system 1 | 1 | 93 | 6 |
| system 2 | 5 | 60 | 35 |
| system 3 | 30 | 35 | 35 |

Figure 5:
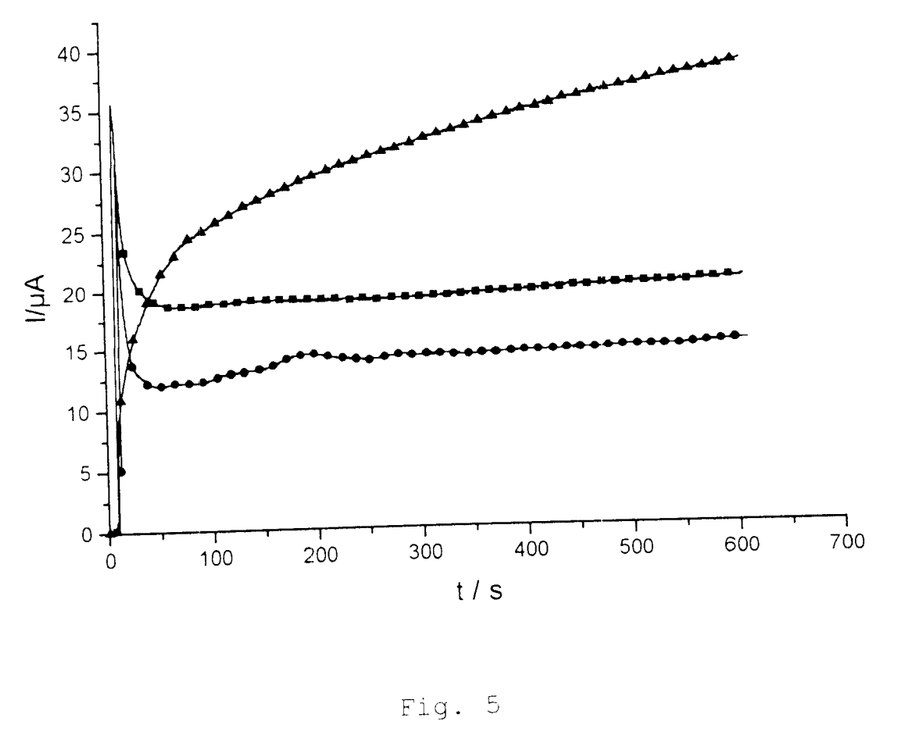
FIG. 5: shows the current transients for the polymerization of EDT microemulsions:
System 1: 1% EDT, 93% 0.5 M $LiClO_4$, 6%; Lutensol ON 110; System 1 symbolized by [)];
System 2: 5% EDT, 60% 0.5 M $LiClO_4$, 35%; Lutensol ON 110; System 2 symbolized by [,];
System 3: 30% EDT, 35% 0.5 M LiClO4, 35%; Lutensol ON 110; System 3 symbolized by [3];
$U_B$: 1.2 V (SHE); platinum single crystal electrode with a surface of $7.4 \cdot 10^{-3}\ cm^2$; abscissa X=t [s];
ordinate Y=I $[\mu A]$;
(Experiment 2.2.2)

The electrochemical formation of poly(ethylenedioxythiophen) was performed at 30° C. in a temperature-controlled electrochemical cell with a three-electrode configuration (working electrode: platinum single crystal or platinum sheet with areas of 7.4·10$^{-3}$ cm$^2$ and 1 cm$^2$ respectively; counter electrode: platinum sheet with an area of 4 cm$^2$; reference electrode: mercury sulfate electrode with K$_2$SO$_4$ as electrolyte) and a home made potentiostat system (Schramm, HHU Duesseldorf). After a pre-polarization at 0.4 s for 20 s the anodic deposition potential of 1.2 V (SHE) was applied for 600 s. The current transients during deposition are shown in FIG. 5. As can be recognized for low oil concentrations, initially, a high current is observed, which then decreases and reaches a slightly increasing plateau. Thereby, the value of system 1 with the lowest EDT concentration fluctuates comparably strongly in comparison. From about 5% EDT content the current becomes stable, thus the deposition conditions are better defined. At high EDT content the current even increases after 600 s. In all cases the polymer was obtained as a strongly adherent dense and complete layer which was stable against diluted acids.

2.3. Polymerization of a Liquid Crystal
2.3.1. Coating of an Electrode A system of 18% 3-Methoxythiophene, 35% Lutensol ON 80 and 47% 0.5 M aqueous LiClO$_4$ solution which forms liquid crystals at low temperatures was warmed to 40° C. so that a microemulsion was formed. A platinum sheet which was cooled before in liquid nitrogen was then immersed into this microemulsion so that a liquid crystal was deposited on its surface. The sheet was placed as the anode in the electrolysis cell already described in part 2.2. Polymerization was performed for 600 s. A blue polymer film was obtained.

2.3.2. Production of a Membrane

Figure 6:
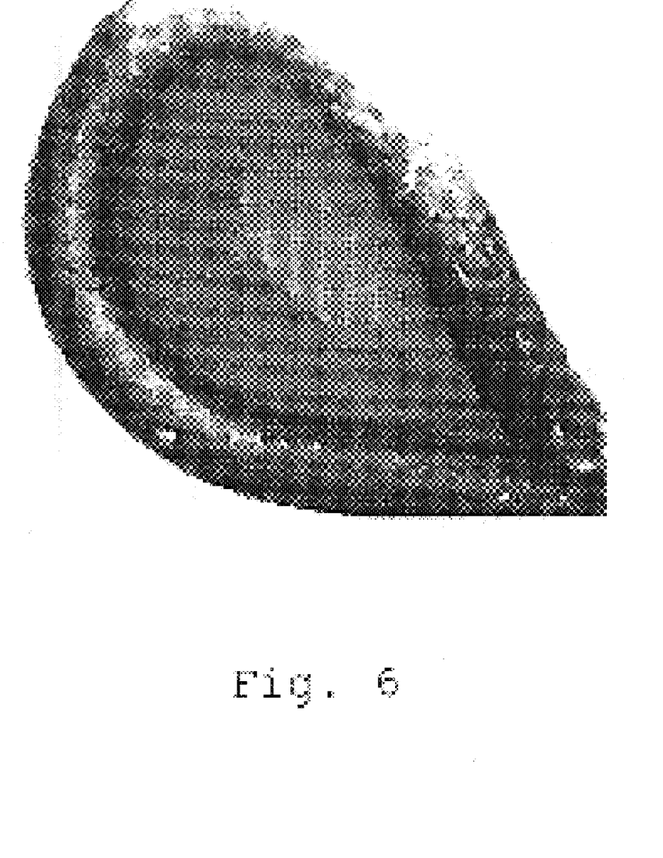
FIG. 6: is a photograph of a membrane of poly(3-methoxythiophene) in a wire loop produced by prior deposition of a liquid crystal layer
(Experiment 2.3.2)

The same system as mentioned in 2.3.1. was used. In this case a loop of platinum wire, which had been immersed in liquid nitrogen before, was inserted into the microemulsion. Thereby a film was formed with the loop as the frame, which, after immersion at 11° C. into a 0.5 M aqueous $LiClO_4$ solution, could be polymerized yielding a membrane (FIG. 6) which was colored blue immediately after the polymerization. After removal of the oxidation potential, the membrane in the electrolyte solution changed to the reduced form becoming red. Upon exposure to air, oxidation by oxygen and a blue coloring of the membrane occurred.

What is claimed is:

1. A water-continuous system in the form of a microemulsion comprising at least one nonionic surfactant, water and an oil of the group consisting of thiophene, furan and alkyl, alkoxy and alkylenedioxy derivatives of thiophene and furan in an amount of at least 30% of the system.

2. A water-continuous system according to claim 1, wherein said oil is selected from the group consisting of thiophene, furan, 3, 4-ethylenedioxythiophene 3-methylthiophene and 3-methoxythiophene.

3. A water-continuous system according to claim 1, wherein said system is a bicontinuous microemulsion.

4. A water-continuous system according to claim 1, including at least one of an alkyl polyethoxylate and an alkyl polyglucoside as the surfactant.

5. A water-continuous system according to claim 1, comprising additionally an electrolyte.

6. A water-continuous system forming a liquid crystal or a mixture of a microemulsion and a liquid crystal and comprising at least one surfactant, water and an oil of the group consisting of thiophene, furan and alkyl, alkoxy and alkylenedioxy derivatives of thiophene and furan in an amount of 1 to 75% of the system.

7. A water-continuous system according to claim 6, wherein said oil is selected from the group consisting of thiophene, furan, 3, 4-ethylenedioxythiophene 3-methylthiophene and 3-methoxythiophene.

8. A water-continuous system according to claim 6, including at least one of an alkyl polyethoxylate and an alkyl polyglucoside as the surfactant.

9. A water-continuous system according to claim 6, comprising additionally an electrolyte.

* * * * *